US010048287B2

(12) United States Patent
Bidmead

(10) Patent No.: US 10,048,287 B2
(45) Date of Patent: Aug. 14, 2018

(54) TACHOMETER SYSTEMS AND METHODS OF DETERMINING THE ROTATION SPEED OF A WHEEL OF A LANDING GEAR OF AN AIRCRAFT

(71) Applicant: Airbus Operations Limited, Bristol (GB)

(72) Inventor: Ashley Bidmead, Bristol (GB)

(73) Assignee: Airbus Operations Limited, Bristol (GB)

(*) Notice: Subject to any disclaimer, the term of this patent is extended or adjusted under 35 U.S.C. 154(b) by 51 days.

(21) Appl. No.: 15/152,381

(22) Filed: May 11, 2016

(65) Prior Publication Data

US 2016/0334435 A1 Nov. 17, 2016

(30) Foreign Application Priority Data

May 11, 2015 (GB) .................................. 1508015.3

(51) Int. Cl.
*G01P 3/46* (2006.01)
*G01P 3/52* (2006.01)
*G01P 3/481* (2006.01)
*G01P 3/488* (2006.01)
*G01P 3/489* (2006.01)
*B64C 25/36* (2006.01)

(52) U.S. Cl.
CPC .............. *G01P 3/465* (2013.01); *B64C 25/36* (2013.01); *G01P 3/46* (2013.01); *G01P 3/481* (2013.01); *G01P 3/488* (2013.01); *G01P 3/489* (2013.01)

(58) Field of Classification Search
CPC .... G01P 3/46; G01P 3/465; G01P 3/48; G01P 3/481; G01P 3/488; G01P 3/489; B64C 25/36

USPC .................................. 324/163, 166, 173, 174
See application file for complete search history.

(56) References Cited

U.S. PATENT DOCUMENTS

| 4,293,814 A | 10/1981 | Boyer |
| 4,742,332 A * | 5/1988 | Schroeder ........... F02D 41/0097 341/15 |
| 4,902,970 A | 2/1990 | Suquet |

(Continued)

FOREIGN PATENT DOCUMENTS

| GB | 2046446 | 11/1980 |
| GB | 2260584 | 4/1993 |
| GB | 2296573 | 7/1996 |

OTHER PUBLICATIONS

Search Report cited in European Patent Application No. 16275073 dated Oct. 7, 2016 (2 pages).

(Continued)

*Primary Examiner* — Arleen M Vazquez
*Assistant Examiner* — Steven Yeninas
(74) *Attorney, Agent, or Firm* — Nixon & Vanderhye P.C.

(57) ABSTRACT

A tachometer system for an aircraft landing gear. The tachometer system includes a tachometer arranged to generate a variable voltage signal in response to the rotation of a wheel of the aircraft landing gear, and a processing system arranged to output a speed signal indicative of the rotation speed of the wheel of the aircraft landing gear. The speed signal is determined from the variable voltage signal from the tachometer using a set of determined parameters. The determined parameters of the processing system are determined from the voltage levels of the variable voltage signal.

18 Claims, 4 Drawing Sheets

(56) References Cited

U.S. PATENT DOCUMENTS

| | | |
|---|---|---|
| 5,019,774 A | 5/1991 | Rosenberg |
| 5,459,398 A | 10/1995 | Hansen et al. |
| 5,510,706 A | 4/1996 | Good |
| 5,554,947 A | 9/1996 | Saitou et al. |
| 2001/0020845 A1 | 9/2001 | Muth |
| 2003/0231013 A1 | 12/2003 | Faymon et al. |
| 2004/0066183 A1 | 4/2004 | Lohberg et al. |
| 2006/0250124 A1* | 11/2006 | Ether ..................... G01P 3/42 324/160 |

OTHER PUBLICATIONS

Search Report cited in Great Britain Patent Application No. 1508015.3 dated Dec. 14, 2015 (4 pages).

* cited by examiner

TACHOMETER SYSTEMS AND METHODS OF DETERMINING THE ROTATION SPEED OF A WHEEL OF A LANDING GEAR OF AN AIRCRAFT

RELATED APPLICATION

This application claims the benefit of United Kingdom Patent Application No. 1508015.3 filed May 11, 2015, which is incorporated herein by reference.

FIELD OF THE INVENTION

The present invention concerns tachometer systems and methods of determining the rotation speed of a wheel of a landing gear of an aircraft. More particularly, but not exclusively, the invention concerns accurately determining low rotation speeds, using existing tachometers intended for determining high rotation speeds only.

BACKGROUND OF THE INVENTION

It is well known to use a tachometer system to determine the speed of rotation of the wheels of the landing gear of an aircraft. Landing gear incorporating a known tachometer system is shown in FIG. 1. The landing gear 1 comprises a wheel 2. The landing gear 1 comprises a motor 3 for the brake cooling fans 8 of the landing gear 1, a shroud 7 to cover the brake cooling fans and a debris guard 9 to prevent large debris from getting into the fan mechanism. A tachometer 5 is mounted upon a tachometer shaft 6. As the wheel 2 rotates, the debris guard 9 rotates (as it is coupled to the wheel 2), and in turn the tachometer shaft 6 rotates (as it is coupled to the debris guard 9). As the tachometer shaft 6 rotates, it rotates the rotor of the tachometer 5. The stator of the tachometer 5 remains stationary, as it is couples to the motor 3, which is coupled to the axle of the wheel 2, which remains stationary during rotation of the wheel 2. In this way, the interaction of the rotor and stator of the tachometer 5 during rotation of the wheel 2 cause the tachometer 5 to generate a variable voltage electrical signal.

This variable voltage signal is processed to produce a speed value, as shown in FIGS. 2 and 3. FIG. 2 is a schematic diagram of the known tachometer system 11.

The variable voltage signal of the tachometer 5 is a raw alternative current (AC) signal 30, which the voltage of which varies as a sine wave as the wheel 2 rotates. The frequency and voltage of the raw signal 30 are proportional to the rotation speed of the wheel 2. The raw signal 30 is fed to a Schmitt trigger 20, which uses upper and lower thresholds THR_UP and THR_DOWN respectively to convert the raw signal 30 into a stepped signal 31, by outputting a "high" value when the raw signal 30 moves above the upper threshold THR_UP, and a "low" value when the raw signal 30 moves below the lower threshold THR_DOWN. As well as converting the raw signal 30 to a signal that can be more easily processed, by setting the thresholds THR_UP and THR_DOWN at sufficiently high magnitudes (for example +1.5V and −1.5V respectively), unwanted noise in the raw signal 30 is eliminated.

The stepped signal 31 is then fed to a processer 21, which uses embedded software to perform further processing of the signal. First, a "tops" signal 32 is generated by outputting a "tick" (i.e. temporarily outputting a high value and otherwise outputting a low value) when the stepped signal 31 transitions from its high value to its low value. A counter signal 33 is then generated from the tops signal 32, in which the counter signal 33 is increased in proportion to the length of time since the last tick of the tops signal 32. In other words, the counter signal 33 is a timer that is reset by a tick of the tops signal 32, that counts the time between the ticks of the tops signal 32. A speed signal 34 is then generated from the counter signal 33, in which the level of speed signal 34 is the level of the counter signal 33 before it was last reset to zero, i.e. just before the previous tick of the tops signal 32. (So as shown in FIG. 3, the speed signal 34 is set at level T1 when the counter signal 33 drops from T1 to zero, and is then set at level T2 when the counter signal 33 drops from T2 to zero, and so on.) The speed signal 34 indicates the determined speed of the wheel 2, and is the output of the processor 21.

While known tachometer systems used for aircraft are designed to be accurate at high speeds, for example at speeds relevant to anti-skid systems, they are generally not accurate at low speeds. This is because at low speeds the raw signal 30 output by the tachometer 5 has low signal-to-noise ratio a low voltage, and becomes dominated by electrical noise and mechanical noise.

It would be advantageous to provide a tachometer system for landing gear that was accurate at low speeds as well as high speeds. This is particularly the case where the landing gear incorporates an electrical drive system, as synchronisation of the speed of the drive motor with speed of the wheel is required to avoid shock loading when then electrical drive system is engaged with the wheel, and also for other low-speed applications such as providing an indication of whether an aircraft is moving or stationary. It would be particularly advantageous to achieve this using existing tachometers, despite their low signal-to-noise ratios at low speeds, so special and/or additional tachometers are not required. Further, known tachometer systems such as the tachometer system 1 usually cannot be used at low speeds at all, as their filtering systems will not accept voltages at the low voltage magnitudes output by known tachometers at low speeds (for example below +/−0.4V), due to the low signal-to-noise ratio.

The present invention seeks to mitigate the above-mentioned problems. Alternatively or additionally, the present invention seeks to provide improved tachometer systems and improved methods of determining the rotation speed of a wheel of a landing gear of an aircraft.

SUMMARY OF THE INVENTION

In accordance with a first aspect of the invention, there is provided a tachometer system for an aircraft landing gear, comprising: a tachometer arranged to generate a variable voltage signal in response to the rotation of a wheel of the aircraft landing gear; and a processing system arranged to output a speed signal indicative of the rotation speed of the wheel of the aircraft landing gear, the speed signal being determined from the variable voltage signal from the tachometer using a set of determined parameters; wherein the determined parameters of the processing system are determined from the voltage levels of the variable voltage signal.

The frequency of the variable voltage signal output by the tachometer increases as the rotation speed of the wheel increases, and this frequency is used to determine the rotation speed. However, as the voltage levels of the variable voltage signal also increases as the rotation speed increases, this allows parameters for processing the variable voltage signal to be determined from the voltage levels, and used to process the variable voltage signal more appropriately at different rotation speed. In this way, an existing tachometer used for determining high rotation speeds can also be used for determining low rotation speeds, without an additional tachometer or other sensors being required. The set of determined parameters can also be used to improve the accuracy of the tachometer system at high rotation speeds.

The processor system may be a hardware processor, a software processor, or an embedded software system, for example, or a combination thereof.

The determined parameters may be determined from the maximum and minimum voltage levels of the variable voltage signal.

The processing system may comprise a frequency filter that passes only signals within a determined frequency range. The frequency filter may be a band-pass filter. Alternatively, the frequency filter may be a low-pass filter or a high-pass filter. Advantageously, the determined frequency range is determined from the voltage levels of the variable voltage signal. This allows the frequency filter to remove unwanted noise, without removing frequencies of the signal required to determine the rotation speed, even though the relevant frequencies will differ for different rotation speeds.

The processing system may comprise a dynamic relay arranged to receive the variable voltage signal and output a stepped signal that is at a first level when the variable voltage signal is above a first determined threshold, and at a second level when the variable voltage signal is below a second determined threshold. In this way, the stepped signal can be generated even at low rotation speeds when the voltage levels output by the tachometer will be of low magnitude. The first and second determined thresholds may be determined from the voltage levels of the variable voltage signal. The voltage levels of the variable voltage signal may be the maximum and minimum voltage levels. The variable voltage signal may be filtered by the frequency filter described above before being used to generate the stepped signal.

The processing system may be arranged to determine the speed signal by determining when the stepped signal transitions between one of the first and second level and the other of the first and second level. In this case, advantageously the processing system is arranged to determine a range of rotation speeds from the voltage levels of the variable voltage signal, and is further arranged to output a modified speed signal when the rotation speed indicated by the stepped signal falls outside the range of rotation speeds determined from the voltage levels of the variable voltage signal. This allows a range of rotation speeds that are plausible to be determined from the voltage levels of the variable voltage level, and the speed signal to be checked against this range of plausible rotation speeds and modified if required. This allows the speed signal to be more robust at low rotation speeds, when unwanted noise is more likely to be significant given the lower voltage levels of the variable voltage signal. The stepped signal itself may be modified in the process of generating the modified speed signal. The processing system may be arranged to ignore a transition of the stepped signal when the rotation speed indicated by the stepped signal is above the range of rotation speeds determined from the voltage levels of the variable voltage signal. The processing system may also arranged to assume an additional transition of the stepped signal has occurred when the rotation speed indicated by the stepped signal is below the range of rotation speeds determined from the voltage levels of the variable voltage signal. These provide convenient and appropriate ways to modify the speed signal when it is determined that it is outside the plausible range of rotation speeds.

The processing system may be arranged to determine the level of the speed signal based upon the time taken between the preceding transitions of the stepped signal.

The processing system may be arranged to output, when the stepped signal transitions, a modified speed signal determined from the rotation speed indicated by a set of preceding stepped signals. Advantageously, the set of preceding stepped signals is determined using the speed signal. For example, the set of preceding stepped signals may be a preceding number, where the number is larger for higher indicated rotation speeds. Alternatively, the set of preceding stepped signals may be a fixed number of most recent preceding stepped signals. The modified speed signal may be an average of the rotation speed indicated by a set of preceding stepped signals. The average may be the mean or median, for example.

The processing system may be arranged to output, when the stepped signal transitions, a modified speed signal if the current rotation speed indicated by the stepped signal differs from the rotation speed indicated by the previous stepped signal by more than a predetermined threshold. The speed signal may be modified by continuing to output the speed signal obtained from the previous stepped signal. In the case that the predetermined threshold is exceeded on a predefined number of consecutive occasions, the speed signal may be modified by outputting the mean of the speed signals corresponding to stepped signal levels. The predefined number of consecutive occasions may be seven. This can be appropriate to filter out short-period electrical noise. Alternatively and/or additionally the predefined number of consecutive occasions may be fifteen. This can be appropriate to filter out long-period mechanical noise. Advantageously, the predefined number of consecutive occasions is determined from the speed signal. This allows more values to be used at higher speeds to give a more accurate output, when the stepped signal transitions occur more frequently and so waiting for the values will not cause undue delay.

The processing system may be arranged to determine, when the stepped signal transitions, the speed signal from the median of the speed signals corresponding to a previous consecutive predefined number of stepped signal levels. The previous consecutive predefined number of stepped signal levels may be twelve. This can be appropriate to filter out short-period mechanical noise. Advantageously, the predefined number of stepped signal levels is determined from the speed signal. This allows more values to be used at higher speeds to give a more accurate output, when the stepped signal transitions occur more frequently and so waiting for the values will not cause undue delay.

The processing system may be arranged to output, when the stepped signal transitions, a modified speed signal if the range of rotation speeds indicated by a previous consecutive predefined number of stepped signal levels differs from mean of the indicated rotation speeds by more than a predetermined threshold. The speed signal may be modified by continuing to output the speed signal obtained from the previous stepped signal. In the case that the predetermined threshold is exceeded on a predefined number of consecutive occasions, the speed signal may be modified by outputting the mean of the speed signals corresponding to stepped signal levels. The predefined number of consecutive occasions may be seven. This can be appropriate to filter out long-period electrical noise. Advantageously, the predefined number of stepped signal levels is determined from the speed signal. This allows more values to be used at higher speeds to give a more accurate output, when the stepped signal transitions occur more frequently and so waiting for the values will not cause undue delay.

In each case above, by modifying the output signal only when the stepped signal transitions, the processing of the signal uses a sample frame length dependent upon the frequency of the variable voltage signal, so providing better accuracy at low rotation speeds.

In accordance with a second aspect of the invention, there is provided a method of determining the rotating speed of a wheel of a landing gear of an aircraft, wherein the aircraft comprises a tachometer arranged to generate a variable voltage signal in response to the rotation of a wheel of the aircraft landing gear, the method comprising the steps of: determining a set of parameters from the voltage levels of the variable voltage signal; generating a speed signal indicative of the rotation speed of the wheel of the aircraft landing gear from the variable voltage signal using the set of determined parameters; and outputting the speed signal.

The determined parameters may be determined from the maximum and minimum voltage levels of the variable voltage signal.

The step of generating the speed signal may comprise the step of filtering the variable voltage signal to pass only signals within a determined frequency range. In this case, the determined frequency range is determined from the voltage levels of the variable voltage signal.

The step of generating the speed signal may comprise the step of generating a stepped signal from the variable voltage signal by, wherein the stepped signal is at a first level when the variable voltage signal is above a first determined threshold, and at a second level when the variable voltage signal is below a second determined threshold. In this case, advantageously the first and second determined thresholds are determined from the voltage levels of the variable voltage signal. The speed signal may be determined from the stepped signal by determining when the stepped signal transitions between one of the first and second level and the other of the first and second level.

The step of generating the speed signal may comprise the steps of: determining a range of rotation speeds from the voltage levels of the variable voltage signal; and outputting a modified speed signal when the rotation speed indicated by the stepped signal falls outside the range of rotation speeds determined from the voltage levels of the variable voltage signal. The method further may comprise the step of ignoring a transition of the stepped signal when the rotation speed indicated by the stepped signal is above the range of rotation speeds determined from the voltage levels of the variable voltage signal. The method may also further comprise the step of assuming an additional transition of the stepped signal has occurred when the rotation speed indicated by the stepped signal is below the range of rotation speeds determined from the voltage levels of the variable voltage signal.

The method further may comprise the step of determining the level of the speed signal based upon the time taken between the preceding transitions of the stepped signal. Advantageously, the method further comprises the step of, when the stepped signal transitions, modifying the speed signal if the current rotation speed indicated by the stepped signal differs from the rotation speed indicated by the previous stepped signal by more than a predetermined threshold. Advantageously, the method further comprises the step of, when the stepped signal transitions, determining the speed signal from the median of the speed signals corresponding to a previous predefined number of stepped signal levels. The method further may comprise the step of, when the stepped signal transitions, modifying the speed signal if the range of rotation speeds indicated by a previous predefined number of stepped signal levels differs from mean of the indicated rotation speeds by more than a predetermined threshold.

In accordance with a third aspect of the invention, there is provided a computer program product arranged, when executed on a computing device of a tachometer system, to provide a tachometer system as described above, or a tachometer system that performs any of the methods described above.

In accordance with a fourth aspect of the invention, there is provided an aircraft comprising a tachometer system as described above, or a tachometer system that performs any of the methods described above.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which.

DETAILED DESCRIPTION

Figure 1:
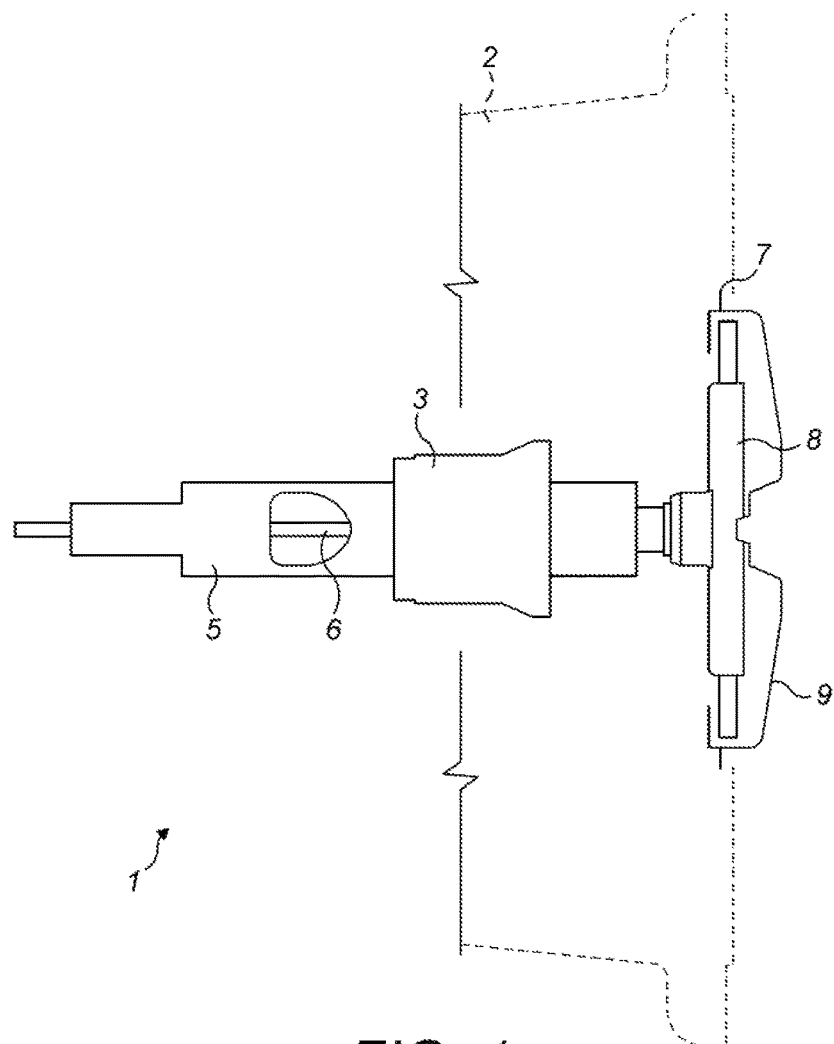
FIG. 1 shows a known aircraft landing gear comprising a tachometer system.
Figure 2:
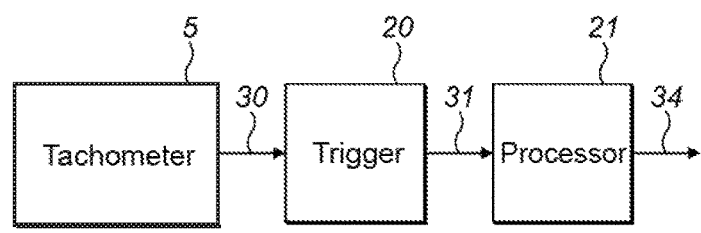
FIG. 2 is a schematic diagram of the tachometer system of FIG. 1.
Figure 3:
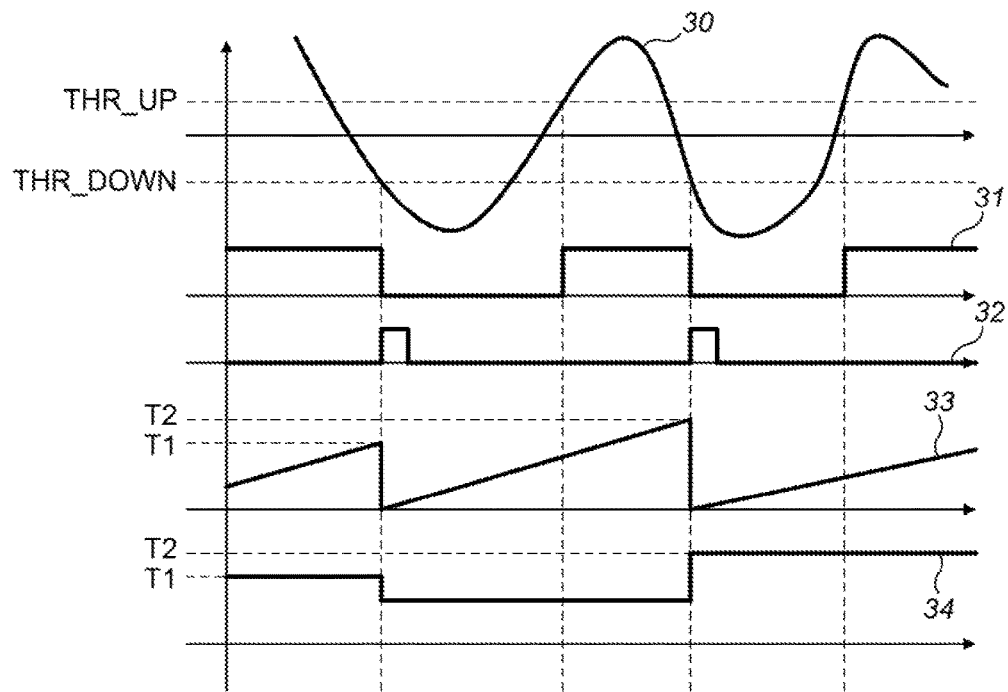
FIG. 3 is a graph showing various signals of the tachometer system of FIG. 1.

A tachometer system in accordance with the invention is now described with reference to FIGS. 4 to 6. The tachometer system is for a landing gear such as the known landing gear 1 shown in FIG. 1. The tachometer system accounts for noise in the raw signal output by the tachometer at low speeds.

Figure 4:
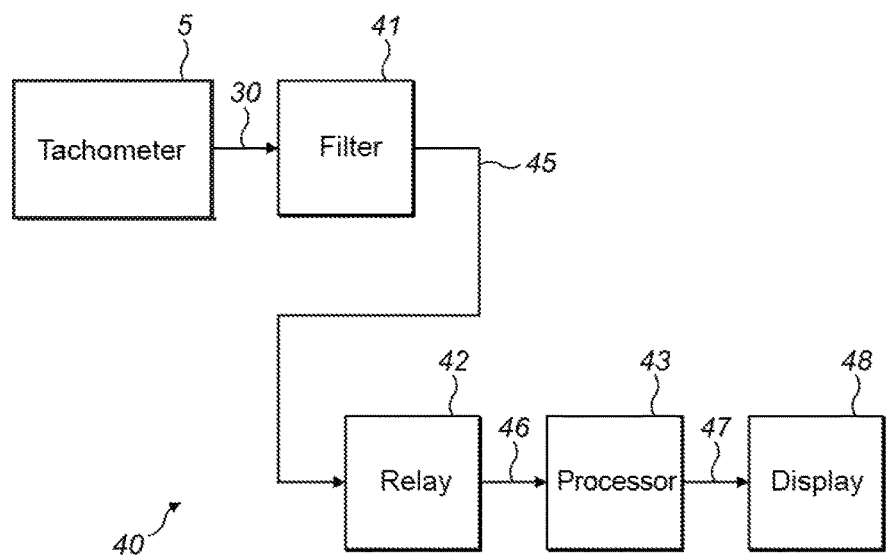
FIG. 4 is a schematic diagram of a tachometer system in accordance with an embodiment of the invention.

A schematic diagram of the tachometer system 40 is shown in FIG. 4. The tachometer system 40 includes the existing tachometer 5, which outputs its raw AC signal 30. This signal is filtered by a dynamic band pass filter 41, to produce a filtered signal 45, and then by a dynamic relay 42, to generate a stepped signal 46. The stepped signal 46 is then further processed by a processer 43, to provide a speed signal 47, that may be output to and shown on a cockpit display 48.

Figure 5:
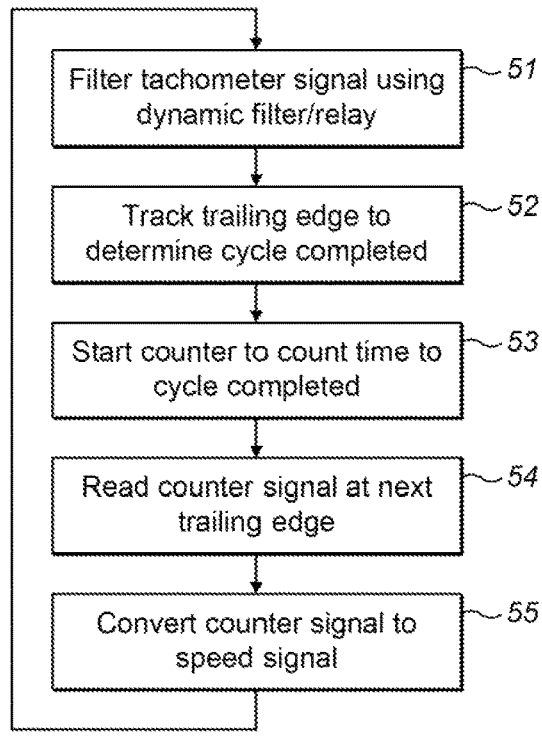
FIG. 5 is flowchart showing the overall operation of the tachometer system of FIG. 4.

The overall operation of the tachometer system 40 is shown in the flowchart of FIG. 5. First, as mentioned, the raw signal 30 of the tachometer 5 is filtered by the dynamic bad pass filter 41 and dynamic relay 42, to give the stepped signal 46 (step 51). The filtering by the dynamic bad pass filter 41 and dynamic relay 42 is described in more detail below.

The trailing edge of the stepped signal 46 is then tracked, to determine when a cycle has completed, i.e. a transition of the stepped signal 46 from its high value to its low value (step 52). A counter is then started to count the time to the cycle next completing (i.e. the next trailing edge/transition) (step 53). When the next trailing edge/transition occurs, the counter signal is read (step 54), and converted to the speed signal 47 (step 55). The process is then repeated until the next trailing edge/transition occurs (step 51 again). During this process, processing of the stepped signal 46 generated by the dynamic relay 42 occurs, again as described in more detail below.

The filtering of the raw signal 30 of the tachometer 5 is now described in more detail. First, the raw signal 30 is passed through the dynamic band pass filter 41, to produce a filtered signal 45 in which any frequencies above or below determined thresholds are removed. The thresholds are determined using the maximum and minimum voltages of the raw signal 30, in one embodiment determined from five previous cycles of the raw signal 30. As both the voltage levels and the frequency of the raw signal 30 will rise together as the rotation speed measured by the tachometer 5 rises, this allows unwanted electrical noise (or at least a component of it) to be eliminated without adversely affecting the relevant frequency information provided by the raw signal 30, because the thresholds used by the dynamic band pass filter 41 can be changed based on the maximum and minimum voltages, to ensure that the relevant frequency information always passes through the band pass filter 41 and so is present in the filtered signal 45.

Unwanted electrical noise may be produced for example by electromagnetic interference from other electric systems in the landing gear, such as electrical brake cooling fans for braking systems. In one embodiment, the speed signal 47 is also used to determine the thresholds used by the dynamic band pass filter 41.

The filtered signal 45 is then used by the dynamic relay 42, to produce the stepped signal 46. Similarly to the dynamic band pass filter 41, the upper and lower thresholds used by the dynamic relay 42 are determined using the maximum and minimum voltages of the raw signal 30. This in particular allows the dynamic relay 42 to operate effectively at low speeds when the voltage levels of the raw signal 30 from the tachometer 5 will be very low.

In one embodiment, the upper and lower thresholds are set to be a voltage magnitude from 0V, determined from the voltage levels of the raw signal 30. In an advantageous alternative embodiment, the upper and lower thresholds are set to be a percentage of the maximum and minimum voltage magnitudes, say 75%, with respect to the middle point between the maximum and minimum voltage. So for example, if the minimum voltage is −0.2V and the maximum voltage is 0.6V, the middle point is 0.2V, with the minimum voltage being 0.4V below this and the maximum voltage 0.4V above this. 75% of 0.4V is 0.3V, and so the minimum threshold is −0.1V and the maximum threshold is 0.5V. This allows for the situation that the raw signal 30 oscillates around a voltage level offset from 0V, as has been found to be the case with some braking system for which the raw signal has a voltage offset of around 0.1V.

In an alternative embodiment, no dynamic band pass filter 41 is used, and the raw signal 30 is received directly by the dynamic relay 42. In other alternative embodiments, a filter other than a dynamic band pass filter is used to filter the raw signal 30 before it is passed to the dynamic relay 42.

The stepped signal 46 output by the dynamic relay is then processed similarly to known tachometer systems, to produce a "tops" signal and a counter signal. As discussed above, a counter counts the time since a previous transition/ trailing edge of the stepped signal 46. However, in addition the maximum and minimum voltages of the raw signal 30 are used to determine if the value of the counter signal is plausible. As noted above, the values of the maximum and minimum voltages can be used to determine a plausible range for the speed being measured by the tachometer 5. Noise in the raw signal 30 can adversely affect the stepped signal 46 in two main ways. First, the noise can cause a transition to be missed. In this case the counter signal will not be reset, leading to an implausibly high value for the counter signal. Alternatively, the noise can cause an extra transition to occur. In this case the counter signal will be reset too soon, leading to an implausibly low value for the counter signal. To avoid this, maximum and minimum plausible limits for the counter signal can be determined from the raw signal 30. If the counter signal rises above the maximum plausible limit, it can be assumed that a transition has been missed and so the counter is reset. Conversely, if the counter signal falls below the minimum plausible limit, it can be assumed that an erroneous transition has occurred and so the most recent transition is ignored.

Figure 6:
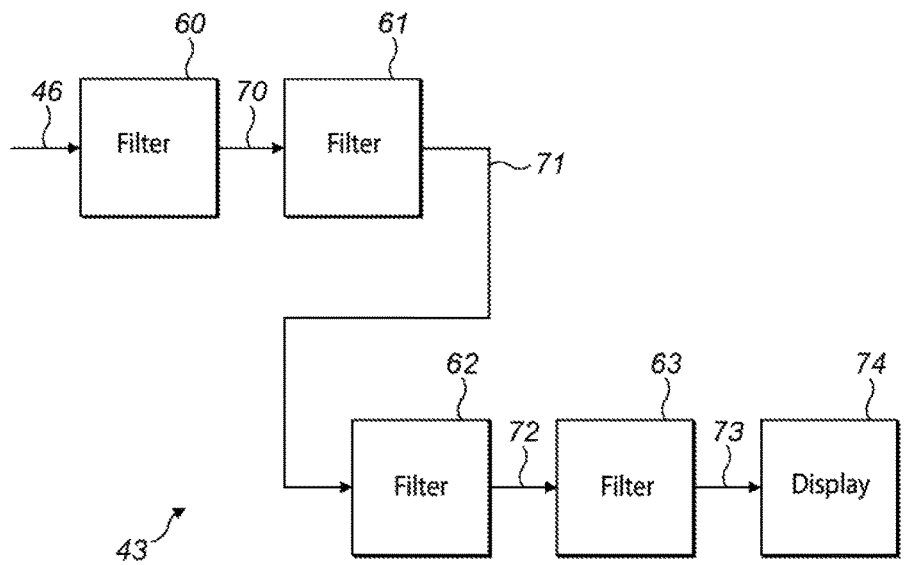
FIG. 6 is a schematic diagram of a processor comprised in the tachometer system of FIG. 4.

The counter signal is then further processed by the processor 43 to remove short- and long-period mechanical and electrical noise, as shown schematically in FIG. 6. The filtering of the noise is based upon the types of noise characterised for the aircraft landing gear on which the tachometer system 40 is used. In alternative embodiments, for different types of aircraft landing gear, different characterisations of occurring noise may lead to alternative filtering being performed.

First, the stepped signal 46 is filtered using a short-period electrical noise filter 60 to provide an output signal 70. Short-period electrical noise is created for example by electromagnetic interference caused by nearby electrical devices.

The short-period electrical noise filter 60 operates as follows. At each transition of the stepped signal, the new value provided by stepped signal 46 is compared with the previous value. If the values are within a predetermine threshold, the new value is output as output signal 70. If the threshold is exceeded, the previous value continues to be output. If seven consecutive values exceeding the threshold are encountered, the mean of the seven values is output as output signal 70. (None of the seven values will have been output, as for each the threshold was exceeded.) In this way, short-period electrical noise affecting nearby cycles is filtered from the signal.

The output signal 70 is then filtered by a short-period mechanical noise filter 61. Short-period mechanical noise is created by mechanical effects on the operation of the tachometer 5, for example that affect the interaction between the parts of the tachometer 5 such as its stator and magnets, or the rotation of the drive shaft 6 due to bending or vibration of nearby items such as the hubcap of the wheel 2 or the like. The short-period mechanical noise filter 61 operates by calculating the median of the previous twelve values of the output signal 70, which is then output as the output signal 71.

The output signal 71 is then filtered by a long-period electrical noise filter 62. Long-period electrical noise is again created for example by electromagnetic interference caused by nearby electrical devices. The long-period electrical noise filter 62 operates by determining the range of the previous seven values. If the range is within a predetermined threshold from the mean of the values, the current value is output as the output signal 72. If the threshold is exceeded, the previous value continues to be output. If for seven consecutive values the threshold is exceeded, the mean of the seven consecutive values is output as the output signal 72.

The output signal 72 is then filtered by a long-period mechanical noise filter 63. Long-period mechanical noise is again created mechanical effects on the operation of the tachometer 5. The long-period mechanical noise filter 63 operates by determining if the current value differs from the previous value by more than a predetermined threshold. If the threshold is not exceeded, the current value is output as the output signal 73. If for fifteen consecutive values the threshold is exceeded, the median of the fifteen consecutive values is output as the output signal 73. A cockpit display 74 may receive and show a graphical representation of the output signal.

It will be appreciated in other embodiments some or all of short- and long-period electrical and mechanical noise filters could be included, and could be arranged in different orders. It will be further be appreciated that while amounts such as seven, twelve or fifteen consecutive values have been used in the filters described above, in alternative embodiments, more or fewer consecutive values could be used. In particularly advantageous alternative embodiments, the number of consecutive values is based upon the rotation speed of the wheel 2, with more values being used at higher speeds. Using more values gives a more accurate output, but at low speeds waiting for the required number of values can cause undue delay. At higher speeds, stepped signal transitions occur more frequently, and so values are obtained more quickly, allowing more values to be used without undue delay occurring.

The output signal 73, which is a processed version of the counter signal, is then converted to the speed signal 47 by outputting the value of the counter signal when it was last reset, in a similar manner to known tachometer systems.

Figure 7:
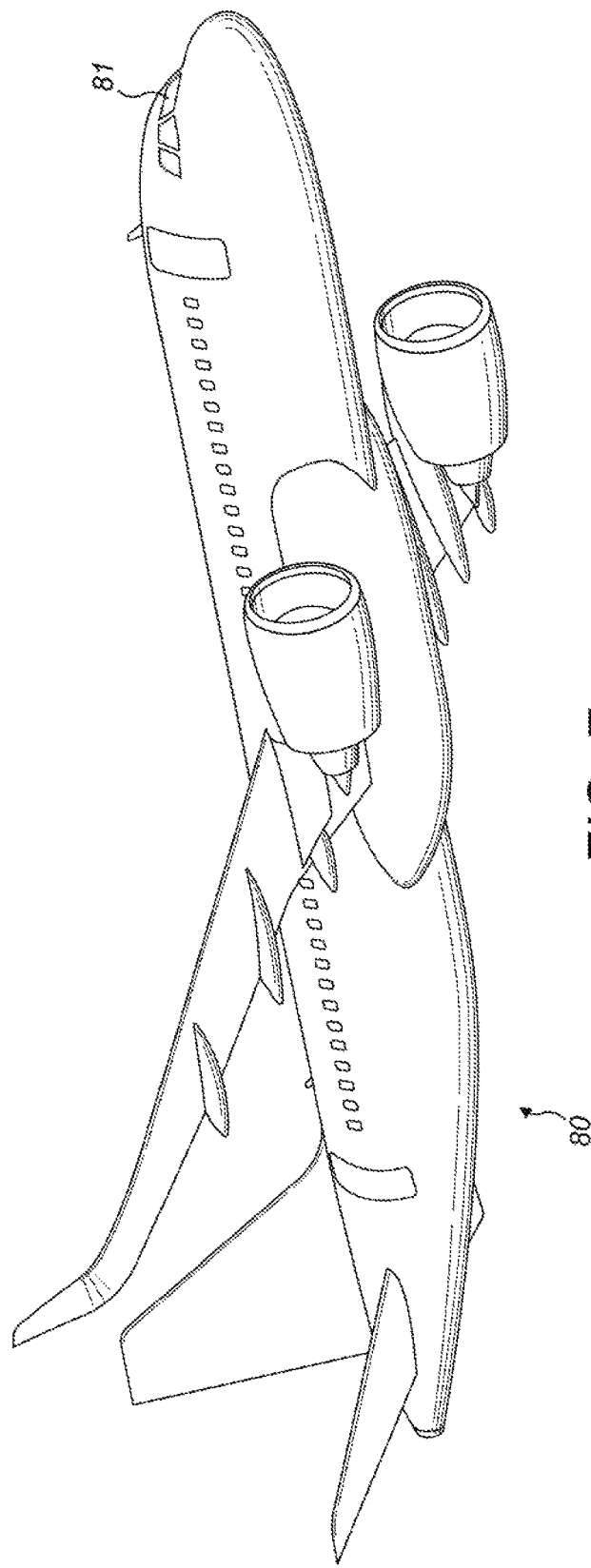
FIG. 7 is an aircraft comprising the tachometer system of FIG. 4.

FIG. 7 shows an aircraft 80 incorporating the tachometer system described above. For example, the tachometer system may be coupled to a display in a cockpit 81 of the aircraft, wherein the display presents to a pilot an alphanumeric graphical presentation of the ground speed of the aircraft in real time. The alphanumeric graphical presentation, such as a numeric speed or speedometer image, visually indicates the ground speed and is determined based on the speed value output by the tachometer system.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention is:

1. A tachometer system for an aircraft landing gear comprising:
a tachometer configured to generate a variable voltage signal in response to the rotation of a wheel of the aircraft landing gear; and
a processing system configured to output a speed signal indicative of the rotation speed of the wheel of the aircraft landing gear, the speed signal being determined from the variable voltage signal from the tachometer using a set of determined parameters, and the processing system including a dynamic relay arranged to receive the variable voltage signal and output a stepped signal that is at a first level when the variable voltage signal is above a first determined threshold and is at a second level when the variable voltage signal is below a second determined threshold;
wherein the determined parameters of the processing system are determined from the voltage levels of the variable voltage signal;
wherein the processing system is arranged to:
determine the speed signal by determining when the stepped signal transitions between one of the first and second level and the other of the first and second level;
determine an acceptable range of rotation speeds based on maximum and/or minimum voltage level(s) of the variable voltage signal occurring during prior cycles of the variable voltage signal;
output the speed signal while maximum and/or minimum voltage level(s) of a variable voltage signal of a current cycle of the variable voltage system is/are in the acceptable range, and
output a modified speed signal while the maximum and/or minimum voltage level(s) of the variable voltage signal of the current cycle is/are outside of the acceptable range.

2. The tachometer system as claimed in claim 1, wherein the determined parameters are determined from the maximum and minimum voltage levels of the variable voltage signal.

3. The tachometer system as claimed in claim 1, wherein the processing system is arranged to ignore a transition of the stepped signal when the rotation speed indicated by the stepped signal is above the range of rotation speeds determined from the voltage levels of the variable voltage signal.

4. The tachometer system as claimed in claim 1, wherein the processing system is arranged to assume an additional transition of the stepped signal has occurred when the rotation speed indicated by the stepped signal is below the range of rotation speeds determined from the voltage levels of the variable voltage signal.

5. The tachometer system as claimed in claim 1, wherein the processing system is arranged to determine the level of the speed signal based upon the time taken between the preceding transitions of the stepped signal.

6. The tachometer system as claimed in claim 1, wherein the processing system is arranged to output, when the stepped signal transitions, a modified speed signal determined from the rotation speed indicated by a set of preceding stepped signals.

7. An aircraft comprising a tachometer system as claimed in claim 1, wherein the aircraft includes a display in a cockpit and the display presents an alphanumeric graphical representation of a current ground speed of the aircraft and the current ground speed is determined based on a current value of the speed signal.

8. The tachometer system of claim 1 wherein the prior cycles are cycles of the variable voltage signal immediately preceding the current cycle.

9. The tachometer system of claim 1 wherein the prior cycles are at least five cycles of the variable voltage signal immediately preceding the current cycle.

10. A method of determining the rotation speed of a wheel of a landing gear of an aircraft, wherein the aircraft comprises a tachometer arranged to generate a variable voltage signal in response to the rotation of the wheel of the aircraft landing gear, the method comprising:
   determining a set of parameters from the voltage levels of the variable voltage signal;
   generating a speed signal indicative of the rotation speed of the wheel of the aircraft landing gear from the variable voltage signal using the set of determined parameters by:
      generating a stepped signal from the variable voltage signal by, wherein the stepped signal is at a first level when the variable voltage signal is above a first determined threshold, and at a second level when the variable voltage signal is below a second determined threshold, and wherein the speed signal is determined from the stepped signal by determining when the stepped signal transitions between one of the first and second level and the other of the first and second level;
      determining an acceptable range of rotation speeds based on maximum and/or minimum voltage level(s) of the variable voltage signal occurring during prior cycles of the variable voltage signal;
      outputting the speed signal while maximum and/or minimum voltage level(s) of a variable voltage signal of a current cycle of the variable voltage system is/are in the acceptable range, and
      outputting a modified speed signal while the maximum and/or minimum voltage level(s) of the variable voltage signal of the current cycle is/are outside of the acceptable range.

11. The method as claimed in claim 10, wherein the determined parameters are determined from the maximum and minimum voltage levels of the variable voltage signal.

12. The method as claimed in claim 10, wherein the step of generating the speed signal comprises the step of ignoring a transition of the stepped signal when the rotation speed indicated by the stepped signal is above the range of rotation speeds determined from the voltage levels of the variable voltage signal.

13. The method as claimed in claim 10, wherein the step of generating the speed signal comprises the step of assuming an additional transition of the stepped signal has occurred when the rotation speed indicated by the stepped signal is below the range of rotation speeds determined from the voltage levels of the variable voltage signal.

14. The method as claimed in claim 10, wherein the step of generating the speed signal comprises the step of determining the level of the speed signal based upon the time taken between the preceding transitions of the stepped signal.

15. The method as claimed in claim 10, wherein the wherein the step of generating the speed signal comprises the step of when the stepped signal transitions, determining a modified speed signal from the rotation speed indicated by a set of preceding stepped signals.

16. The method of claim 10 further comprising displaying a graphical representation of a current ground speed of the aircraft on a display in a cockpit of the aircraft, wherein the current ground speed of the aircraft is determined based on the speed signal.

17. The method of claim 10 wherein the prior cycles include cycles of the variable voltage signal immediately preceding the current cycle.

18. The method of claim 10 wherein the prior cycles are at least five cycles of the variable voltage signal immediately preceding the current cycle.

* * * * *